United States Patent [19]
Stein

[11] B 3,915,648
[45] Oct. 28, 1975

[54] FLUORESCENCE PROTEIN AND PEPTIDE ANALYZER

[75] Inventor: Stanley Stein, Bloomfield, N.J.

[73] Assignee: Hoffmann-La Roche Inc., Nutley, N.J.

[22] Filed: Oct. 24, 1973

[21] Appl. No.: 409,220

[44] Published under the Trial Voluntary Protest Program on January 28, 1975 as document no. B 409,220.

[52] U.S. Cl. .................. 23/253 R; 23/259; 210/321
[51] Int. Cl.² .................. B01D 13/00; G01N 31/08; G01N 33/16
[58] Field of Search............ 23/253 R, 259; 250/432; 210/22, 321

[56] References Cited
UNITED STATES PATENTS

| | | | |
|---|---|---|---|
| 2,846,121 | 8/1958 | Ronnebeck | 23/253 R |
| 3,182,043 | 5/1965 | Kirkland | 210/22 X |
| 3,222,135 | 12/1965 | Ashmead | 23/259 X |
| 3,567,389 | 3/1971 | Coulter et al. | 23/253 R |
| 3,591,667 | 7/1971 | Kulshrestha | 210/321 X |
| 3,763,374 | 10/1973 | Tiffany et al. | 250/432 X |

*Primary Examiner*—Robert M. Reese
*Attorney, Agent, or Firm*—Samuel L. Welt; Jon S. Saxe; George M. Gould

[57] ABSTRACT

A fluorescence-based analyzer, which is readily adaptable to protein or peptide analysis. The adaptability of the analyzer is derived from a novel rotating sample loopholder. In the protein analysis mode, this sample loopholder is provided with a number of loops made of a semi-permeable membrane and the sample loop holder is immersed within a dialysis solution. Thus, a protein containing sample is dialyzed to remove low-molecular weight contaminants which can interfere with the fluorescence measurement. When the instrument is in the peptide analysis mode the aforesaid sample loops are made out of inert, non-porous plastic capable of withstanding strong alkali and elevated temperatures, i.e., 100°C., and the peptide or protein samples contained therein are hydrolyzed to the constituent amino acids.

9 Claims, 7 Drawing Figures

FLUORESCENCE PROTEIN AND PEPTIDE ANALYZER

BRIEF DESCRIPTION OF THE INVENTION

A new class of fluorogens has recently been developed that reacts readily with the primary amino groups of amino acids, peptides and proteins to yield a highly fluorescent fluorophor. Fluorescence techniques for assaying these amine-containing compounds and apparatus useful therefor has been described in a number of scientific papers, including for example Bohlen et al., *Arch Biochem. Biophys.*, 155, 213 (1973), Stein et al., *Arch. Biochem. Biophys.*, 155, 202 (1973) and Udenfriend et al., *Science*, 178, 871 (1972). A particularly preferred fluorogen is fluorescamine which is now commercially available.

Protein analysis can be conducted either directly on the original sample materials or alternatively and preferably, on sample materials which have been pretreated by dialysis or hydrolysis. The reason for this preference in the case of dialysis is that in many instances the assay samples represent physiological fluids, such as blood plasma, spinal fluid, tissue homogenates or partially purified enzyme preparations which contain interfering contaminants such as low molecular weight amines. It is known in the art that such contaminants can be selectively removed by column purification techniques such as gel filtration. However, such procedures suffer from the disadvantage that the column must be flushed after passage of each sample in order to remove the contaminants. Thus, the number of samples that can be handled in any time period is relatively small due to the long interval between samples. This restricts the commercial usefulness of such techniques.

In the hydrolysis mode the preference lies in the fact that the constants for various proteins (fluorescence/gm protein) may not be very close. Hydrolysis prior to fluorescent assay will result in these values being closer and will thus give a truer absolute protein determination. In addition a several fold increase in sensitivity will be attained. Furthermore, adding the hydrolysis capability will enhance the flexibility of the analyzer system since it could then function as a peptide analyzer as well as a protien analyzer. Therefore, the same basic mainframe and components can be used for either function with realization of substantial hardware savings to the user.

The protein and peptide analyzer of the present invention is described in the accompanying drawing in whicn FIG. 1 is a schematic view of the analyzer system in the hydrolysis mode;

Figure 1:
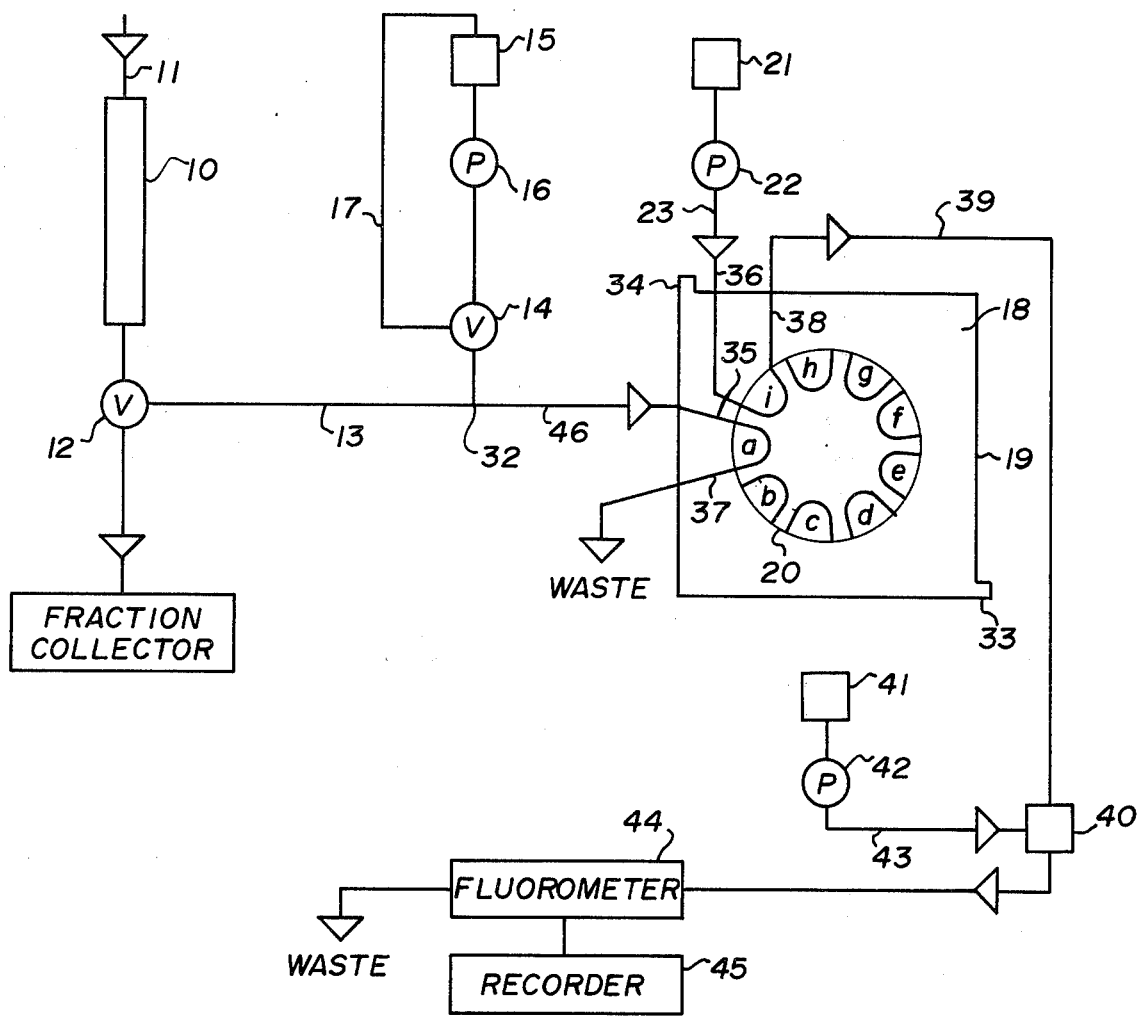

Turning first to the analyzer system in the hydrolysis mode depicted in FIG. 1, a sample stream containing peptides or proteins to be analyzed is eluted from chromatographic column means 10 by means of an elution stream comprising a conventional aqueous buffer, e.g., sodium citrate, sodium acetate, pyridinium acetate, and the like, introduced through inlet line 11 from a buffer reservoir (not shown). The column eluent sample stream containing varying amounts and types of peptides or proteins, depending on the time of elution, passes through a two-position valve 12 to a conventional, automatic fraction collector. Valve 12 is in the collecting position at this point in the operating cycle as shown by the solid lines inside the valve.

At a desired point in the fraction collection operation, the fraction collector either directly or by means of a signal previously provided to an external electric timer, produces a signal causing valve 12 to index to the sampling position. This position diverts the eluent stream via line 13 to alkaline solution addition tee 32.

The alkaline addition valve 14 is the recycling position when valve 12 is in the collecting position. In this recycling position, alkaline solution such as aqueous sodium hydroxide, potassium hydroxide or other similar bases conventionally used to hydrolyze peptides or proteins is taken from reservoir 15 by means of pump 16 and passed through valve 14 to recycle to reservoir 15 by means of line 17.

When valve 12 is indexed to the sampling position, valve 14 is similarly indexed to its addition position. In the addition position of valve 14, the alkaline solution is added to the sample stream via tee 32 and the resulting alkaline sample solution is passed to the hydrolyzer component 18 by means of line 46. The concentration of alkali added to the sample stream is optional and will generally be in the range conventionally employed in peptide hydrolysis, e.g., 1 to 5 mmol/ml. of sample solution. It is within the skill of the art to adjust the flow rate of the sample stream and/or the alkali concentration of the alkaline solution, and/or the flow rate of the alkaline solution in order to obtain the desired final concentration of alkali in the sample stream.

The hydrolyzer component comprises an outer enclosure 19 which defines an internal cavity which contains conventional heating means such as a steam bath, water bath or heating coil and the hydrolyzer sample loopholder, 20 which is described in further detail later. If liquid heating means such as steam or hot water are employed, these liquids can be introduced and removed through inlet and outlet means 33 and 34 as desired.

The hydrolyzer sample loopholder 20 contains an inlet 35 for receiving the alkaline sample stream from line 46 and an inlet 36 for buffer solution, such as phosphate or borate buffer pH 8–9 from reservoir 21 by means of pump 22 and line 23.

Outlet 37 is provided for passing excess sample stream to waste while outlet 38 is utilized to transfer hydrolyzed sample stream from the sample holder to the detector component of the analyzer via line 39.

The sample loopholder 20 in the depicted embodiment of FIG. 1 is shown to contain nine sample loops identified as loops $a - i$. The sample loops in this embodiment are constructed out of inert, non-porous plastics which are stable to strong alkali at temperatures of 100°C. and higher. A suitable plastic for this purpose is a fluorinated polyethylene such as Teflon.

When valves 12 and 14 are in the sampling and addition positions, alkaline sample stream flows through the sample loop indexing with inlet 35, i.e., sample loop $a$. At any desired point in this cycle, sample loopholder 20 is activated by an external signal which causes a stepping motor to step 40° (for this embodiment) with similar rotation of the holder. Such rotation causes entrapment and transfer of that amount of alkaline sample stream contained in loop a at the moment of rotation.

Generally, it is possible to utilize a sample loopholder having from about 4 to 40 sample loops. In such case the stepping motor employed would have a corresponding step of from 90° to 9°. Thus, for example, if the sample loopholder contained 20 sample loops then the stepping motor would have a step of 18°.

At the point of the cycle shown in FIG. 1, sample loop a is being filled with alkaline sample stream, sample loops b–h each containing entrapped alkaline sample stream are in progessive stages of hydrolysis and sample loop i is having its entrapped sample discharged by means of buffer stream supplied by reservoir 21 and pump 22 into the detector portion of the analyzer.

Hydrolysis of peptides in alkaline solution is conducted at elevated temperatures, most preferably at about 95°C. or even higher. Thus, a heating means is provided in chamber 18 to produce the desired temperature within the sample loops. In one preferred embodiment heated fluids such as steam or hot water are introduced into the hydrolyzer component through inlet 33 and exhausted through outlet 34. The sample loops are thus bathed in the heated fluid.

In order to assure proper conditions for complete hydrolysis of the peptides in the alkaline sample solution, the holding time for the filled sample loops between the filling position and the discharge position should be at least about 15 minutes. Maximum holding time is obtained by placing the discharge outlets adjacent to the inlets so that the arc of rotation between the two positions is at a maximum when the direction of rotation is as shown. Suitable adjustments of the time between activating signals to the stepping motor as well as to the number of steps in the complete rotation may be made to produce the desired holding time.

The buffered, hydrolyzed sample stream leaving the hydrolyzer component via line 39 is passed through a mixing tee 40 or other suitable liquid mixing device known in the art and treated with a desired amount of fluorogen solution provided from reservoir 41 by pump 42 through line 43. The preferred fluorogen utilized herein is a member of the new class of 4-(substituted)-spiro-[furan-2(3H), 1′-phthalan]-3,3′-diones (as disclosed in U.S. Pat. application Ser. No. 212,790, filed Dec. 27, 1971, now Pat. No. 3,812,181; inventors, Leimgruber and Weigele) which fluorogens react with primary amine groups such as those produced by hydrolysis of peptides and proteins. A particularly preferred fluorogen for this purpose is fluorescamine which is now commercially available.

The sample stream now containing fluorophors produced by the reaction of the aforesaid fluorogen with the amino acids and peptide fragments contained in the buffered, hydrolyzed sample stream is then passed to fluorometer means 44. Suitable fluorometer means include spectrofluorometers or filter fluorometers equipped with flow cells. Measurement of the fluorescence produced by the excitation of the aforesaid fluorophor results in an electrical signal being produced, which signal is directly proportional in amplitude to the intensity of the fluorescence. This electrical signal is transmitted to recorder means 45 where it is graphically displayed as a series of peaks corresponding to the various samples being produced through the analyzer and corresponding in turn to the peptide content of the fractions eluted from the column from which these samples were derived.

The area under each peak is proportional to quantity of primary amine groups in the hydrolyzed sample which in turn is proportional to the quantity of peptide or protein in the original sample. If absolute amounts of peptide or protein are to be determined, the analyzer can be standardized by using samples of known peptide or protein content.

Figure 2:
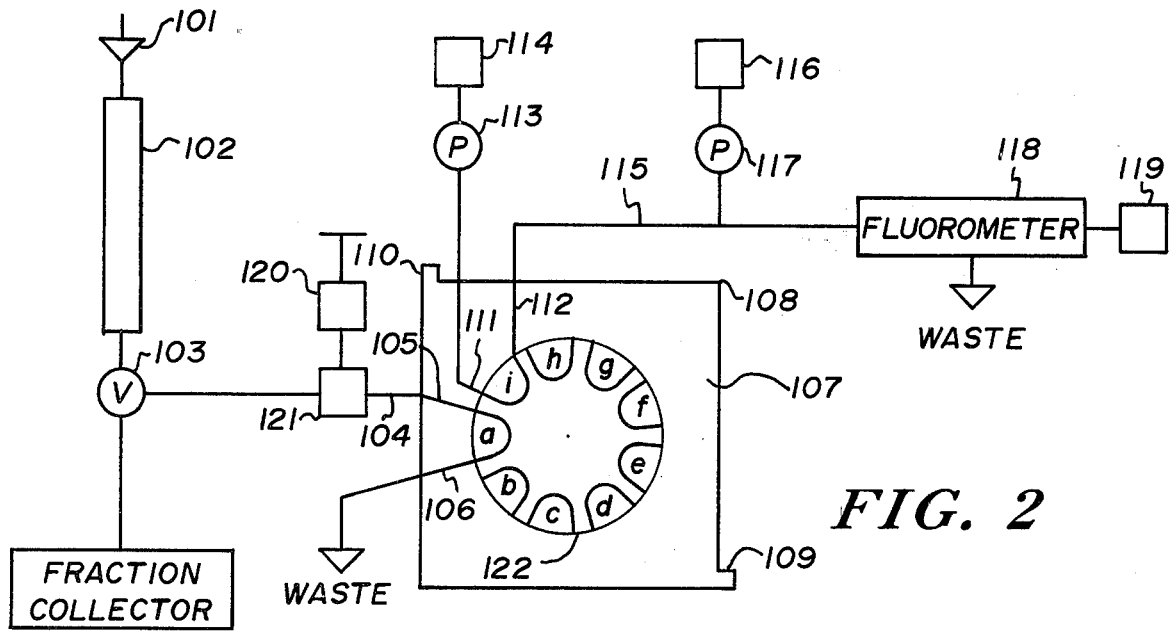
FIG. 2 is a schematic view of the analyzer system in the dialysis mode.

In FIG. 2, the analyzer system is shown in the dialysis mode suitable for protein column monitoring. A protein separation means 102 such as a chromatographic gel filtration or ion exchange column containing conventional gel filtration or ion exchange materials is loaded with a protein sample and then eluted with suitable buffers introduced by line 101. The eluted protein is then passed through two-position valve 103 which is in the collecting position and the protein stream is collected in any suitable collection such as a fraction collector.

At any desired point in the collecting cycle valve 103 is indexed by a suitable signal and the valve is placed in the sampling position. The sample stream containing the protein sample is then introduced into the dialyzer component 108 by means of line 104 and inlet 105. In an alternate embodiment, protein samples can be introduced in a manual fashion utilizing sample injection means. Suitable sample injection means include a sample syringe 120 which introduces the sample into line 104 while valve 121 serves to isolate the column 102 and valve 103 during manual sampling.

The dialyzer component will be of essentially the same design and construction as previously discussed for the hydrolyzer component of FIG. 1 with the exception that sample loops a –i of sample loopholder 109 will be made of semi-permeable cellulose hollow fibers in tubular form. As before, the sample stream runs through the sample loop (loop a) which is indexed to inlet 105 and passes to waste through outlet 106. At a desired point in the cycle, sample loopholder 109 is activated either automatically, or in the case of manual sampling, by a manually initiated signal and rotates one step thereby entrapping the portion of the sample stream contained in loop a. The sample loops are in direct contact with dialyzer solution which is provided in constant flow by inlet 109 so as to fill the internal chamber 107 of dialyzer component 108. The dialyzer solution may be water or aqueous solutions of materials which assist dialysis of contaminants out of the sample loops and which are conventionally employed in the dialysis art.

Low molecular weight contaminants, such as low molecular weight amines which are generally present in protein samples, particularly those derived from biological fluids, are selectively passed through the dialysis tubing forming the sample loop into the dialysis solution filling chamber 107. The dialysis solution now containing the low molecular weight contaminants passes out of the dialysis chamber through outlet 110 to waste or recycle.

It is generally desired to maintain each protein sample in the dialyzer component for a total time of from about 10 to about 720 minutes or even more. This can be accomplished by suitable adjustments in the time period involved for each step and/or the number of steps provided for the cycle.

The dialysis cycle is complete when the sample loop in question indexes with inlet 111 and outlet 112. Buffer solution provided from reservoir 114 and pump 113, serves to wash out the sample loop indexing with the aforesaid inlet and outlet. The dialyzed sample stream is then carried by line 115 where it is mixed with fluorogen provided by reservoir 116 and pump 117 as previously described for the hydrolysis mode. The fluorophor produced by the reaction of the fluorogen and the primary amino groups on the protein molecule is then detected by fluorometer means 118 and the result depicted by recorder 119, all as before. The area under each peak will now represent a quantity which is proportional to the quantity of protein in the corresponding sample.

Figure 3:
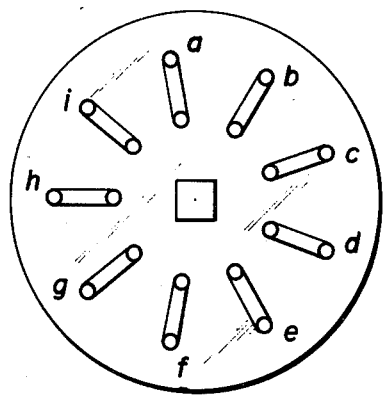
FIG. 3 is a top view of the rotator structure of the sample loop holder.

In FIG. 3 a top view of the rotator section of the sample loopholder is shown. A plurality of paired channels are symmetrically spaced around the center axis of the rotator. Connecting and bridging each pair of channels is a sample loop. In the embodiment shown nine sample loops are shown, identified as $a$ –$i$. Greater or lesser numbers of sample loops may be employed provided that they are again symmetrically spaced about the center axis. A shaft running from the stepping motor (not shown) terminates in the center of the rotator and provides the source of rotational energy.

Figure 4:
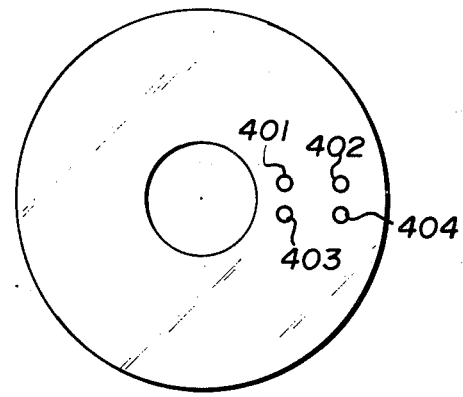
FIG. 4 is a top view of the stator structure of the sample loopholder.

FIG. 4 depicts the top view of the stator section of the sample loopholder. Only two pairs of channels are provided in the stator. One pair, channels 403 and 404, is employed as the sample stream inlet and waste outlet for the filling position. The second channel pair, 401 and 402, is utilized as the buffer stream inlet and detector outlet for the emptying position. The remaining portion of the stator is solid with the exception of the central hole through which the shaft extending to the rotator fits. The shaft is not connected to the stator and rotation of the shaft does not import any motion to the stator.

Figure 5:
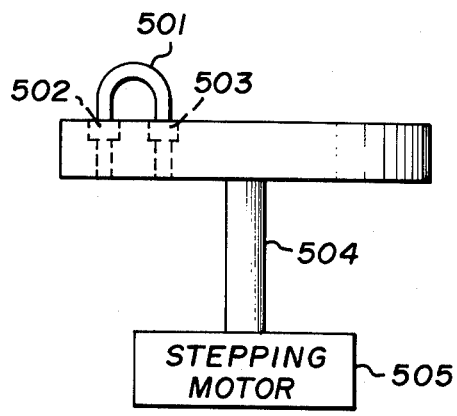
FIG. 5 is a side view of the rotator structure.

A side view of the rotator is presented in FIG. 5. One of the plurality of sample loops contained in the rotator is shown at 501. This sample loop is seen to bridge the two channels 502 and 503 which form a channel pair in the rotator. The upper portion of each channel is enlarged somewhat so as to be able to receive the respective ends of the sample loops in a liquid-tight fit. Rotation of the rotator is accomplished by corresponding rotation of shaft 504 produced when stepping motor 505 is activated.

Figure 6:
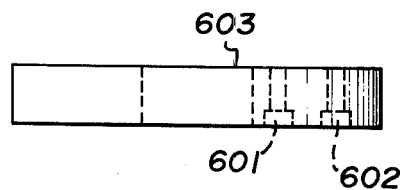
FIG. 6 is a side view of the stator structure.

A side view of the stator is shown in FIG. 6. One channel pair is shown as 601 and 602. In this instance, the lower portion of each channel is enlarged so as to accept the tubings used for fluid inlets and outlets in a liquid-tight manner. The central shaft hole is shown at 603.

Figure 7:
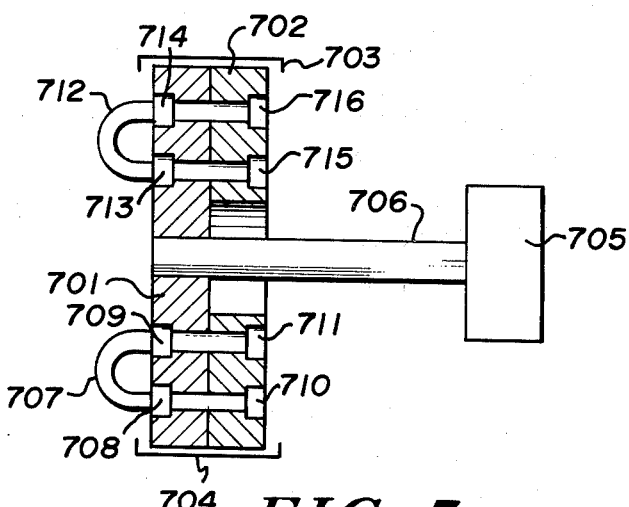
FIG. 7 is a side view of the assembled sample loopholder.

The assembled sample loop holder is shown is side view in FIG. 7. Rotator 701 is firmly clamped to stator 702 by means of circumference clamps 703 and 704. The surfaces between these two elements are preferably machined to a low friction finish so as to allow rotation of the rotator relative to the stator and to provide a liquid-tight seal between the stator and rotator. As previously indicated, rotation of the rotator is accomplished by activation of stepping motor 705 causing shaft 706 to turn. Shaft 706 is connected to the rotator but passes freely through the stator by means of the central hole therein previously discussed.

In the embodiment shown in the subject Figure, sample loop 707 bridges channel pair 708 and 709 in the rotator. The aforesaid channel pair is in liquid flow relationship with a channel pair 710 and 711 in the stator. Similarly, sample loop 712 is seen to bridge channel pair 713 and 714 which are indexed with a corresponding channel pair 715 and 716 of the stator.

Taking the lower position as representing the filling position, then in operation sample stream would enter channels 710 and 708 and fills sample loop 707. The sample stream would then exit via channels 709 and 711 to the fraction collector or waste depending on whether a hydrolysis or dialysis mode were being used. Upon activation of the stepping motor 705, the shaft 706 would be rotated one step with concomitant rotation of rotator 701 relative to stator 702. Channels 708 and 709 would no longer index with any channels of the stator and since a liquid-tight seal exists between the stator and rotator, any liquid in sample loop 707 would be entrapped when the rotation occurs.

Similarly, at the upper end, which is the emptying position, buffer solution enters channel 716 and 714, washes out entrapped liquid in sample loop 712 and then passes such liquid out through channels 713 and 715 to the detector component of the system.

Since the major components and construction of the system remain the same whether the system is in the hydrolysis or dialysis mode, the system can be given maximum flexibility by employing a modular approach to the sample handling components and using snap-in sample loops which can be constructed of semipremeable membrane materials for the dialysis mode and inert, non-permeable, heat resistant plastic material for the hydrolysis mode. In this manner, with only minimum conversion, the present system can adapt to either peptide or protein analysis.

I claim:

1. An analyzer system which is adaptable to the fluorescence based assay of either protein or peptide containing samples which system comprises in combination:
   A. sample stream providing means which sample stream contains either protein or peptide compounds to be assayed;
   B. sample loopholder means adaptable to be in a dialysis or hydrolysis mode, said sample loopholder means comprising:
   i. an outer enclosure defining an internal chamber which chamber contains dialysis solution in said dialysis mode and heating means in said hydrolysis mode; and
   ii. a sample loopholder component comprising a stepping motor means, shaft means connected to said stepping motor means, a stator element having two radially disposed channel pairs and a rotator element connected to said shaft means having a plurality of channel pairs radially and and symmetrically disposed about its central axis, said plurality of channel pairs being so arranged and constructed as to serially index with each of said channel pairs in said stator elements as said rotator is rotated relative to said stator, each of said rotator channel pairs further having a sample loop bridging the two channels in each pair, said sample loop being selected from the group consisting of a semipermeable cellulose tube for the dialysis mode and an inert, non-porous, heat and alkali stable plastic for the hydrolysis mode, said rotator and said stator being held together tightly to form a liquid tight seal between them with said rotator being rotatable with respect to said stator; and C. fluorescence detection means, wherein said sample stream providing means is operatively connected to one channel of one of said channel pairs of said stator so as to provide a sample stream to said channel and any channel of said rotator which is indexed therewith and said fluorescence detection means is operatively connected to one channel of the other of said channel pairs so as to obtain a dialyzed or hydrolyzed sample stream for assay.

2. The analyzer system of claim 1 wherein said surfaces between said rotator and said stator are machined to a low friction finish so as to provide said liquid tight seal between them.

3. The analyzer system of claim 1 wherein said stepping motor has a step corresponding to the number of channel pairs in said rotator.

4. The analyzer system of claim 1 wherein said sample loops are detachably attached to said channels in a liquid tight fit.

5. The analyzer system of claim 1 wherein in said hydrolysis mode said sample stream providing means comprises chromatographic column means, first valve means having a collecting and a sampling position, fraction collector means, and alkaline addition means comprising alkaline solution reservoir means, pump means and second valve means having an addition and a recycle position; wherein a sample stream from said chromatographic column means is provided said fraction collector means when said first valve means is in said collecting position and is provided to said sample loopholder means when said first valve means is in said sampling position, wherein further said second valve means is in recycle position when said first valve means is in collecting position and said second valve means is in addition position when said first valve means is in sampling position so that a desired amount of alkaline solution from said reservoir means is added to said sample stream being provided to said sample loopholder.

6. The analyzer system of claim 1 wherein in said dialysis mode said sample stream providing means comprises chromatographic column means, valve means having a collecting and a sampling position, and fraction collector means, wherein a sample stream from said chromatographic column means is provided said fraction collector means when said valve means is in collecting position and is provided to said sample loopholder means when said valve means is in its sampling position.

7. The analyzer of claim 1 wherein said fluorescence detection means comprises fluorogen solution reservoir means, pump means, fluorometer means and recorder means whereby the hydrolyzed or dialyzed sample stream from said sample loopholder means is treated with said fluorogen solution so as to form a fuorophor in said sample stream which is excited and the resulting fluorescence measured in said fluorometer means and a signal proportional to said measured fluorescence is given to said recorder means where it is graphically displayed.

8. The analyzer system of claim 1 wherein in said dialysis mode said sample stream providing means comprises sample injection means for introducing samples manually into said sample loopholder means.

9. The analyzer system of claim 8 wherein said sample injection means comprises a syringe.

* * * * *